US012688480B2

(12) United States Patent
Bash et al.

(10) Patent No.: US 12,688,480 B2
(45) Date of Patent: Jul. 21, 2026

(54) TECHNIQUES FOR IMPROVED USER EXPERIENCE IN PAYLOAD DELIVERY

(71) Applicant: Flytrex Aviation Ltd., Tel Aviv (IL)

(72) Inventors: Yariv Bash, Tel Aviv (IL); Amit Regev, Tel Aviv (IL); Roman Dvorkin, Givatayim (IL); Vadim Zlotnik, Beer Sheva (IL)

(73) Assignee: Flytrex Aviation Ltd., Tel Aviv (IL)

( * ) Notice: Subject to any disclaimer, the term of this patent is extended or adjusted under 35 U.S.C. 154(b) by 0 days.

(21) Appl. No.: 18/329,196

(22) Filed: Jun. 5, 2023

(65) Prior Publication Data

US 2024/0403802 A1 Dec. 5, 2024

(51) Int. Cl.
*G06Q 10/083* (2024.01)

(52) U.S. Cl.
CPC ................................. *G06Q 10/083* (2013.01)

(58) Field of Classification Search
CPC .................................................... G06Q 10/083
See application file for complete search history.

(56) References Cited

U.S. PATENT DOCUMENTS 9,969,494 B1 * 5/2018 Buchmueller ........... B64D 1/12
10,515,557 B2 12/2019 Kubie et al.

| | | | | |
|---|---|---|---|---|
| 11,790,313 | B1 * | 10/2023 | Clise | B64D 1/12 |
| | | | | 705/338 |
| 2020/0094962 | A1 * | 3/2020 | Sweeny | B64D 1/02 |
| 2020/0250998 | A1 * | 8/2020 | Priest | B64C 39/024 |
| 2022/0024600 | A1 * | 1/2022 | Surace | B64U 10/20 |
| 2022/0101248 | A1 * | 3/2022 | Grant | G06F 40/20 |
| 2024/0321116 | A1 * | 9/2024 | Robeson | G08G 5/0013 |

OTHER PUBLICATIONS

A. A. Wirabudi, L. Hafiza and N. R. Fachrurrozi, "Design Autonomous Drone Control for Delivery Package using Prim Algorithm and Waypoint Method," 2022 13th International Conference on Information and Communication Technology Convergence (ICTC), Jeju Island, Korea, Republic of, 2022, pp. 1183-1188, (Year: 2022).*

* cited by examiner

*Primary Examiner* — George Chen
*Assistant Examiner* — Danielle Elizabeth Zevitz
(74) *Attorney, Agent, or Firm* — M&B IP Analysts, LLC

(57) ABSTRACT

A system and method for improving payload delivery utilizing environmental factors is disclosed. The method includes receiving a request for delivery of a payload, the request including a destination location; determining an optimal height for a release of the payload at the destination location, wherein the payload is delivered by a UAV configured to hover at the destination location; generating a navigation plan including a flight path having an origin point and the destination location; and configuring the UAV to execute the navigation plan and release the payload at the destination location from the determined optimal height.

20 Claims, 8 Drawing Sheets

300

301

RECEIVE, AT AN UNMANNED AERIAL VEHICLE (UAV), AN OPTIMAL HEIGHT AND A FLIGHT PATH FOR A PAYLOAD DELIVERY

302

EXECUTE, AT THE UAV, THE OPTIMAL HEIGHT AND THE FLIGHT PATH FOR THE PAYLOAD DELIVERY

303

DELIVER, AT THE UAV, A PAYLOAD TO A SURFACE

START

END

TECHNIQUES FOR IMPROVED USER EXPERIENCE IN PAYLOAD DELIVERY

TECHNICAL FIELD

The present disclosure relates generally to unmanned aerial vehicles performing on-demand delivery, and specifically to techniques for improving user experience in payload delivery.

BACKGROUND

As drone technologies progress, there is a growing interest in utilizing drones for commercial use in the delivery of payload. Drones, also referred to as unmanned aerial vehicles (UAVs), can perform point to point delivery by flying above the ground, bypassing land vehicles, and avoiding traffic. This allows a UAV to take a more efficient routes than a land vehicle is able, avoiding terrain obstacles, with less time delays, resulting in a potential for more deliveries per unit of time.

While deliveries via UAVs have advantages that are not possible with land vehicles, they are not without challenges. Flying the UAV above certain heights, for example, carries the risk of impeding or colliding with manned aircraft (e.g., light aircraft). These heights can also be restricted by aviation regulation, making it unlawful to fly above a certain height.

Another challenge to UAV delivery is flying below certain heights. In order to transport payload, UAVs need to have substantial lift, which can create noise. This noise can be an unwanted negative externality, especially in residential areas where a low level of noise is desirable. These heights can also be restricted by regulation, making it unlawful to fly below a certain height. While some solutions exist around various propeller designs which attempt to mitigate noise, such designs are complex and costly to manufacture, resulting in smaller adoption of these solutions. Some of these designs also reduce the efficiency of the propellers, motors, and the like, resulting in less thrust per Watt.

Yet another challenge to UAV delivery is during the delivery of the payload. UAVs can deliver payloads through a variety of methods including landing the UAV, dropping the payload with a parachute, or lowering the payload with a winch and tether system. Landing the drone for example, carries the risk that the UAV can come in contact with a civilian, potentially causing injury, as well as creating unwanted noise by flying below certain height thresholds.

Dropping the payload via a parachute carries the risk of inaccuracy of delivery which would increase the higher the point of release is. Faster falling parachutes may offer better accuracy, but also increase the probability that the good will be damaged. Releasing the payload by a winch and tether system can be more accurate than a parachute release and allow the UAV to remain above certain heights, thus reducing noise pollution, but it too is not without its challenges. The higher the release point is, the longer the tether becomes and the longer the payload takes to reach the ground both of which may increase the magnitude of precession of the payload, increasing the inaccuracy of landing the payload. In addition, precession can be detrimental to the UAV's ability to fly safely.

All these complications add to delivery time, which decreases the amount and quality of deliveries that can be performed by the UAV in a given timeframe, includes physical risk to humans, and noise pollution.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for using an unmanned aircraft system (UAS) to deliver a payload to a specified location. The method also includes receiving a request for delivery of a payload, the request including a destination location; determining an optimal height for a release of the payload at the destination location, where the payload is delivered by a UAV configured to hover at the destination location; generating a navigation plan including a flight path having an origin point and the destination location; and configuring the UAV to execute the navigation plan and release the payload at the destination location from the determined optimal height. Other embodiments of this aspect include corresponding computer systems, apparatus, and computer programs recorded on one or more computer storage devices, each configured to perform the actions of the methods.

Implementations may include one or more of the following features. The method may include: receiving a weather condition of the destination location; and determining the optimal height further based on the received weather condition. The method may include: determining the optimal height further based on any one of: a payload weight, a payload volume, a payload density, and any combination thereof. The method may include: receiving a request to release the payload; and configuring the UAV to release the payload based on the received request in response to determining that the UAV is at the destination location. The detected noise level and noise generated by the UAV are below a threshold level. Navigation plan includes a flight path from the destination location to the second origin point; and configuring the UAV to execute the second navigation plan and release the second payload at the second destination location. The method may include: receiving a request to cancel the payload delivery; configuring the UAV to stop executing the flight path; and configuring the UAV to execute a second flight path which includes an origin point and a destination location. The request further may include any one of: a payload weight, a payload volume, a payload density, and any combination thereof. The flight path further may include at least one way point between the origin point and the destination location. Implementations of the described techniques may include hardware, a method or process, or computer software on a computer-accessible medium.

One general aspect includes a non-transitory computer readable medium having stored thereon instructions for causing a processing circuitry to execute a process for delivering a payload to a specified location. The non-transitory computer readable medium also includes receiving a request for delivery of a payload, the request including a destination location; determining an optimal height for a release of the payload at the destination location, where the payload is delivered by a UAV configured to hover at the destination location; generating a navigation plan including a flight path having an origin point and the destination location; and configuring the UAV to execute the navigation plan and release the payload at the destination location from the determined optimal height. Other embodiments of this aspect include corresponding computer systems, apparatus, and computer programs recorded on one or more computer storage devices, each configured to perform the actions of the methods.

One general aspect includes a system for delivering a payload to a specified location. The system also includes a processing circuitry; and a memory, the memory containing instructions that, when executed by the processing circuitry, configure the system to: receive a request for delivery of a payload, the request including a destination location; determine an optimal height for a release of the payload at the destination location, where the payload is delivered by a UAV configured to hover at the destination location; generate a navigation plan including a flight path having an origin point and the destination location; and configure the UAV to execute the navigation plan and release the payload at the destination location from the determined optimal height. Other embodiments of this aspect include corresponding computer systems, apparatus, and computer programs recorded on one or more computer storage devices, each configured to perform the actions of the methods.

Implementations may include one or more of the following features. The system where the memory includes further instructions which when executed by the processing circuitry further configure the system to: receive a weather condition of the destination location; and determining an optimal height further based on the received weather condition. The memory includes further instructions which when executed by the processing circuitry further configure the system to: determine the optimal height further based on any one of: a payload weight, a payload volume, a payload density, and any combination thereof. The memory includes further instructions which when executed by the processing circuitry further configure the system to: receive a request to release the payload; and configure the UAV to release the payload based on the received request in response to determining that the UAV is at the destination location. The memory includes further instructions which when executed by the processing circuitry further configure the system to: detect an environmental noise level; determine the optimal height based on the detected environmental noise level, where the detected noise level and noise generated by the UAV are below a threshold level. The memory includes further instructions which when executed by the processing circuitry further configure the system to: receive a delivery completion notification; receive a second payload delivery request, including a second destination location; determine an optimal height for releasing the second payload at the second destination location; generate a second navigation plan including a second flight path having a second origin point and the second destination location, where navigation plan includes a flight path from the destination location to the second origin point; and configure the UAV to execute the second navigation plan and release the second payload at the second destination location. The memory includes further instructions which when executed by the processing circuitry further configure the system to: receive a request to cancel the payload delivery; configure the UAV to stop executing the flight path; and configure the UAV to execute a second flight path which includes an origin point and a destination location. The request further may include any one of: a payload weight, a payload volume, a payload density, and any combination thereof. The flight path further may include at least one way point between the origin point and the destination location. Implementations of the described techniques may include hardware, a method or process, or computer software on a computer-accessible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
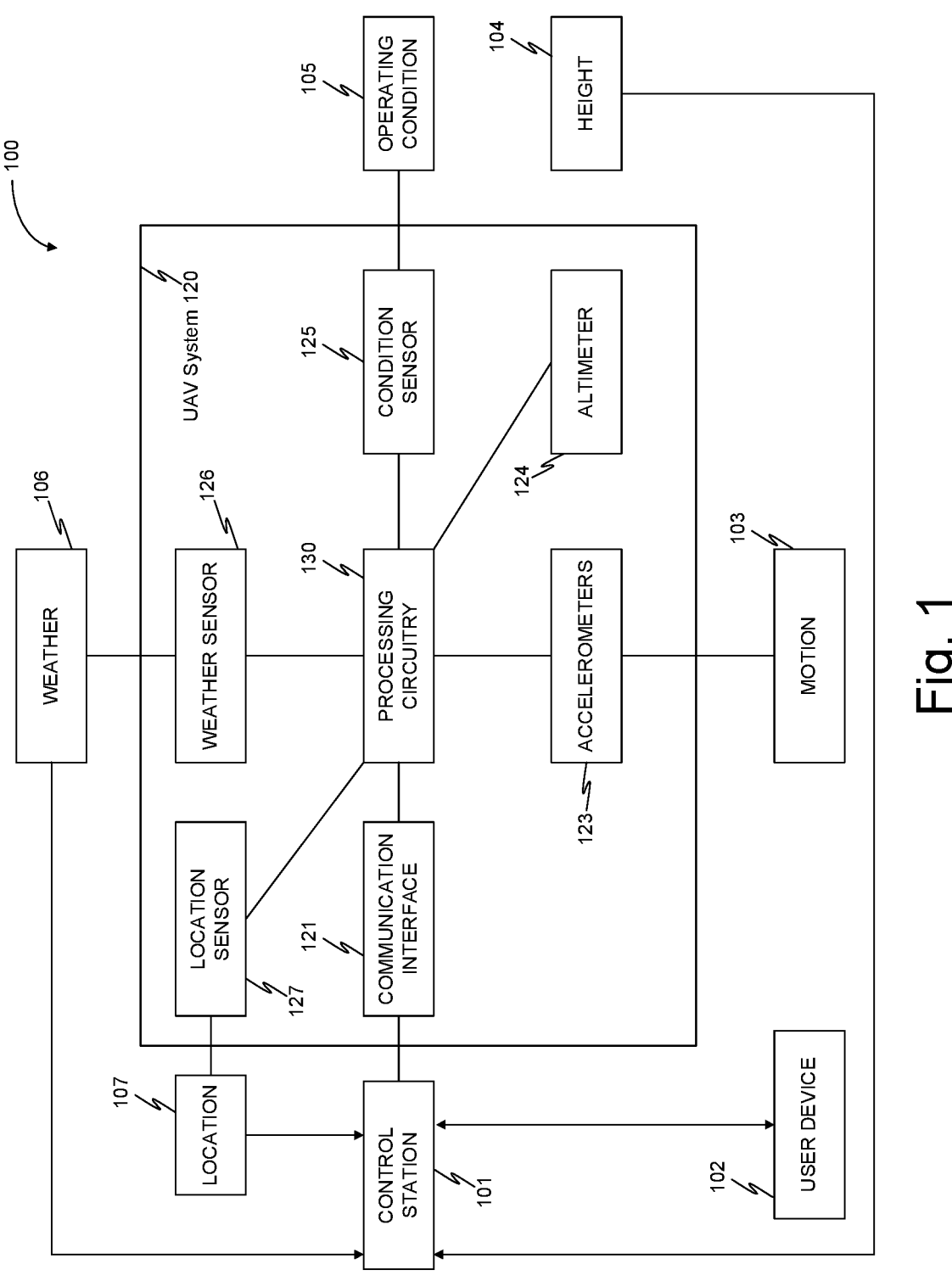
FIG. 1 is a diagram of a UAS, according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for improving user experience in payload delivery by unmanned aerial vehicles (e.g., drones). According to an embodiment, a UAV is configured to generate environmental measurements, such as wind force, noise level, and the like, and a payload delivery height is determined based on the measurements. In certain embodiments, a control server is configured to receive measurements from the UAV, from third party sources, and the like, and determine an optimal payload delivery height based on the received measurements. In some embodiments, the optimal payload delivery height is further determined based on payload data, such as payload weight, payload volume, payload density, payload type (e.g., solid, liquid, etc.), and the like.

According to an embodiment, determining an optimal height allows the UAV to reduce noise sensed by a payload recipient, increasing payload delivery accuracy, and increasing payload delivery efficiency, all of which are factors which contribute to the satisfaction of the payload recipient. Increasing satisfaction of the payload recipient is desirable, as it increases the likelihood of the recipient using the UAV delivery service again.

In this regard, it is realized that a human can program a UAV to release a payload at a predetermined height. However, a human cannot control a fleet of drone delivery UAVs and determine an optimal delivery height for each and every one of them in a manner which is reliable, and objective, since a human will always make a subjective decision. For example, faced with the same data, a human applies subjective criteria to come to different results. This is inconsistent and is disadvantageous. The disclosed system solves at least this by applying objective criteria in a manner which is reliable and repeatable for each and every determined payload delivery height.

FIG. 1 is an example of an unmanned aerial system (UAS) diagram 100 utilized to describe the various disclosed embodiments. In an embodiment, the UAS diagram 100 includes a control station 101 and a UAV system 120. In some embodiments, the control station 101 includes a server, implemented as a bare metal machine, a virtual machine, a software container, a serverless function, a combination thereof, and the like. In certain embodiment, the server is configured to communicate with the UAV system 120, for example via a network interface card. An example of a control station 101 server is discussed in more detail in FIG. 8 below.

In an embodiment, the control station 101 is configured to determine a navigation plan for the UAV system 120. In some embodiments, the navigation plan includes a flight path, the flight path defined by a plurality of waypoints. In an embodiment, a waypoint includes geo-spatial coordinates. In some embodiments, the flight path includes an origin point and a destination point, each defined by a unique geo-spatial coordinate, such that the payload is delivered at the destination point. In an embodiment, an optimal height, an optimal height range, a combination thereof, and the like, is further determined for delivery of the payload at the optimal height at the destination.

In certain embodiments, the UAV system 120 is configured to receive the navigation plan, the optimal height, optimal height range, a combination thereof, and the like, from the control station 101 and is further configured to execute the navigation plan to deliver the payload from the origin point to the destination point, and release the payload at the optimal height, the optimal height range, and the like.

In some embodiments, the UAV System 120 is implemented as a drone, a fixed wing unmanned vehicle, a rotary-wing unmanned aircraft, a multi-rotor unmanned aircraft, a combination thereof, and the like. In certain embodiments, the UAV system 120 includes a communication interface 121, a processing circuitry 130, a plurality of sensors, a combination thereof, and the like.

In an embodiment, the communication interface 121 includes a transceiver for sending and receiving communication. In some embodiments, the communication interface 121 includes a Wi-Fi® interface, a Bluetooth® interface, a LoRa® interface, a radio frequency interface, a cellular modem, an antenna, a combination thereof, and the like.

In certain embodiments, the processing circuitry 130 is realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information. In some embodiments the processing circuitry 130 includes a memory, such as an off-chip memory, an on-chip memory, a scratchpad memory, a combination thereof, and the like. For example, in an embodiment, the memory is utilized to store the navigation plan.

In some embodiments, the plurality of sensors includes an accelerometer 123, an altimeter 124, a condition sensor 125, a weather sensor 126, a positional sensor 127, a combination thereof, and the like.

In an embodiment the communication interface 121 is configured to receive instructions from the control station 101. In an embodiment, an instruction includes, but is not limited to, the flight path and optimal height from the control station 101. In some embodiments, the communication interface 121 is configured to transmit data from the UAV system 120 including, but not limited to, data measured by the accelerometer 123, the altimeter 124, the condition sensor 125, the weather sensor 126, the location sensor 127, a combination thereof, and the like. In an embodiment, the data is processed, pre-processed, and the like, for example by the processing circuitry 130 prior to transmitting the data to the control station 101 over the communication interface 121.

In some embodiments, the accelerometer 123 is implemented as a plurality of accelerometers such that a first accelerometer is deployed on a plane intersecting a plane on which a second accelerometer is deployed. In an embodiment, three accelerometers are utilized, such that each is utilized to measure acceleration on an axis which is perpendicular to the other two.

In some embodiments, the altimeter 124 is configured to measure a height 104 of the UAV with respect to the ground. For example, in an embodiment the altimeter 124 includes a range finder, such as an optical range finder, utilizing a light source, such as a laser, to measure distance to the ground. In some embodiments, a digital terrain map is utilized to determine ground level above a specific point (determined using, for example, an onboard GPS receiver).

In some embodiments, the condition sensor 125 is configured to measure a condition 105. In an embodiment, the condition 105 is a noise level, for example measured in decibels. In some embodiments, a noise level is utilized to determine an amount of noise present in the environment, including noise generated by the UAV system 120, excluding noise generated by the UAV system 120, and the like.

In certain embodiments, the weather sensor 126 is configured to measure a weather condition 106. In an embodiment, the weather condition 106 includes, but is not limited to, wind, relative humidity, temperature, dewpoint, pressure, a combination thereof, and the like. In certain embodiments, the weather sensor 126 includes an anemometer, a hygrometer, a thermocouple, a thermistor, a barometer, a combination thereof, and the like.

In some embodiments, the location sensor 127 is configured to measure the location 107 of the UAV. In an embodiment, the location sensor 127 includes a global positioning system (GPS) receiver, a GLONASS receiver, GNSS receiver, inertial navigation system, assisted-GPS receiver, local area augmentation system (LAAS), a combination thereof, and the like. In some embodiments, an optical sensor is utilized to determine location, for example by generating an image, processing the image to detect a marker, and determining the location based on the marker. For example, in an embodiment, a marker, a group of markers, and the like, are associated in a list with a unique position on a map. In some embodiments, a multispectral input is utilized to determine location, for example to detect an IR beacon which is configured to transmit location data.

In some embodiments, the plurality of sensors is configured to generate measurements, for example based on the weather condition 106, the location 107, an operating condition 105, a height 104, a motion 103, a combination thereof, and the like. In an embodiment, a measurement is stored as data, transmitted to the control station 101, a combination thereof, and the like. In some embodiments, a measurement is a continuous signal, and stored data is discrete values of that continuous signal.

In an embodiment, the control station 101 is configured to generate an updated navigation plan including an updated optimal height and a flight path. In certain embodiments, the control station 101 is configured to update an optimal height, an optimal height range, a flight path, a combination thereof, and the like, based on a measurement, data, a combination thereof, and the like, received from a sensor, a plurality of sensors, and the like, of the UAV system 120.

In certain embodiments, the control station 101 is configured to transmit the updated instructions. In some embodiments, the UAV System 120 is configured to receive such instructions transmitted from the control station 101, for example utilizing a network interface.

Figure 2:
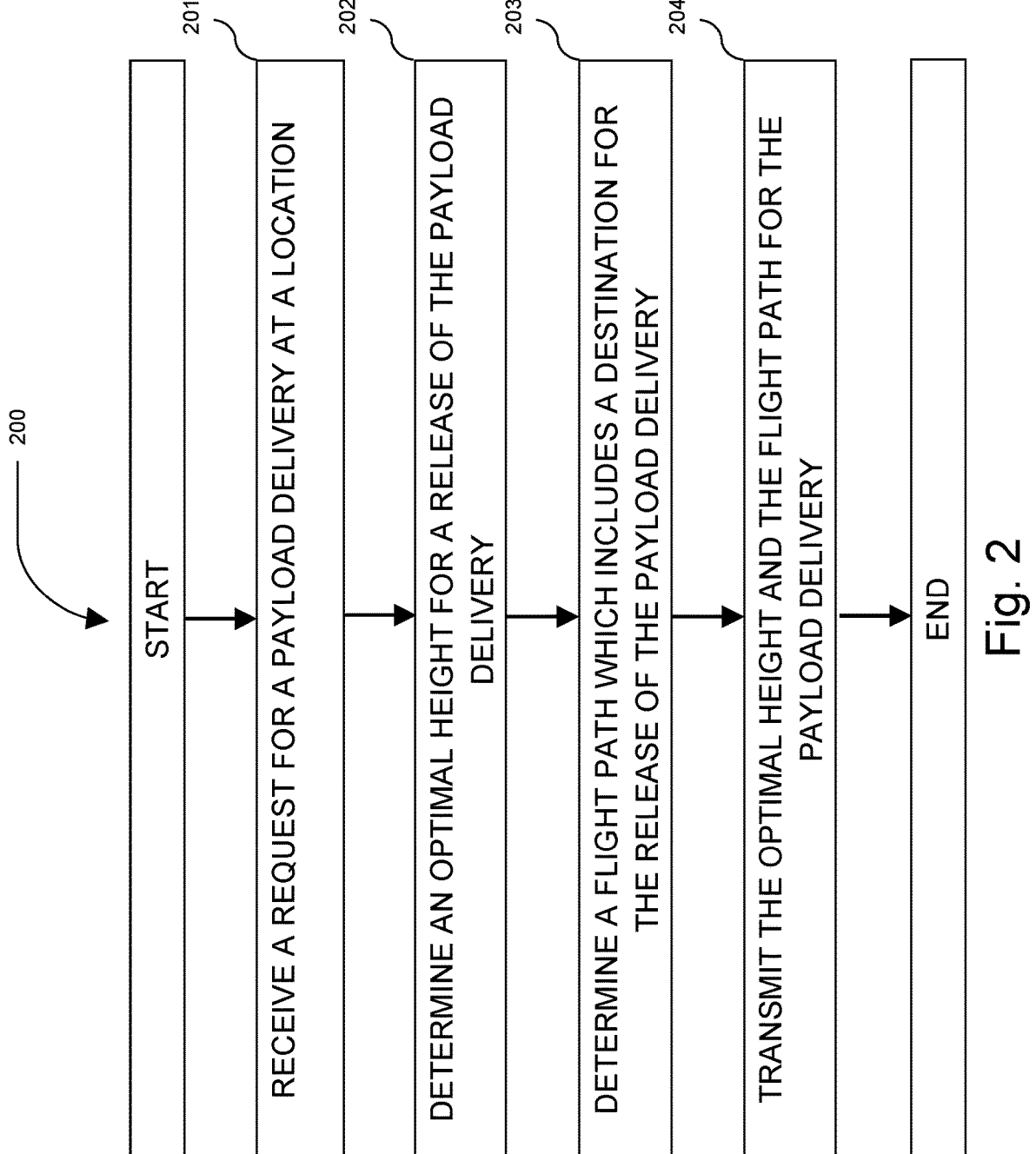
FIG. 2 is a flowchart of a method for automated payload delivery by instruction of a control station to a UAV, according to an embodiment.

FIG. 2 is an example flowchart 200 of a method for automated payload delivery by instruction of a control station to a UAV, implemented in accordance with an embodiment.

At 201, a payload delivery request is received. In an embodiment, the payload delivery request includes a destination location. In some embodiments, the destination location includes coordinates, such as geospatial coordinates. In some embodiments the payload delivery request includes a user device 102 identifier, package metadata, an origin location, a delivery address, combinations thereof, and the like.

In certain embodiments, package metadata includes data related to a payload, such as size, a height measurement, a length measurement, a width measurement, a weight, a combination thereof, and the like.

At 202, an optimal release height is determined. In an embodiment, the optimal release height includes an optimal release height range. In some embodiments, the optimal release height is determined based on a predetermined height, predetermined height range, and the like. In an embodiment, the term height refers to a distance from the ground at a particular location, i.e., ten meters above ground is ten meters above a particular location. In certain embodiments, the term height refers to a distance from sea-level.

In an embodiment, the optimal release height is determined based on the predetermined height. For example, in an embodiment, the predetermined height is adjusted, for example, based on a measurement, data, and the like, received from the UAV which is configured to perform the delivery.

For example, in certain embodiments, a measurement is generated to determine a sound level of an environment in which a drone is present, i.e., a measurement in decibels. In an embodiment, the measurement is compared to a predetermined threshold value.

For example, in an embodiment, the predetermined threshold value is 65 dB. In some embodiments, where the measured noise level exceeds the predetermined threshold value, the drone is configured to release the payload at the optimal height, at a height which is within a threshold of the optimal height range, a height which is within the optimal height range which is closer to the bottom of the optimal height range (e.g., farther from the top of the height range), at a height which is lower than the optimal height, and the like.

In certain embodiments, the release height is determined, further determined, and the like, based on wind speed, payload weight, payload volume, a combination thereof, and the like.

In an embodiment, the optimal height is determined when the drone is at the delivery location. In certain embodiments, the optimal height is selected from a height range, such that the drone, when at the optimal height, does not contribute substantially to the environment noise level.

In an embodiment, contributing substantially to the environment noise level is determined by generating a total noise value based on a value of a predetermined noise level generated by the drone, and a value of environment noise level. In some embodiments, the total noise value is generated by adding the value of the predetermined noise level generated by the drone, and the value of environment noise level. In certain embodiments, the total noise value is compared to a predetermined threshold value. In an embodiment, where the total noise value is below the predetermined threshold value, the drone is configured to release the payload at a height which is lower than a height at which the drone is configured to release the payload where the total noise value is above the predetermined threshold value.

At 203, a flight path is determined. In an embodiment, the flight path includes an original location, a destination location, a waypoint, a heading, a flight envelope, a flight vector, a height, a speed, a geocoordinate, a combination thereof, and the like. In an embodiment, a geocoordinate includes a longitude value, a latitude value, a height, a combination thereof, and the like.

In certain embodiments, the flight path is determined based on a determined environment noise. For example, in an embodiment, a noise map is accessed, which includes measured noise values, each measured noise value associated with a geocoordinate. In an embodiment, a flight path is determined such that the drone maximizes waypoints which are in geocoordinates having a noise level above a threshold, below a threshold, and the like. In some embodiments, the flight path is determined such that the drone minimizes waypoints which are in geocoordinates having a noise level above a threshold, below a threshold, and the like.

For example, in an embodiment, a control station is configured to generate a plurality of flight paths, such that a first flight path includes a destination location and a first waypoint, and a second flight path includes the destination location and a second waypoint, which is not the first waypoint. In some embodiments, the control station is configured to select one of a plurality of flight paths based on a determined noise level, a determined total noise level, a combination thereof, and the like.

At 204, the optimal height and flight path are transmitted. In an embodiment, transmitting the optimal height and flight path are transmitted to a UAV, drone, and the like, by a control station, flight server, and the like, for example over a network. In some embodiments, the network includes a wired component, a wireless component, a network interface, combinations thereof, and the like.

Figure 3:
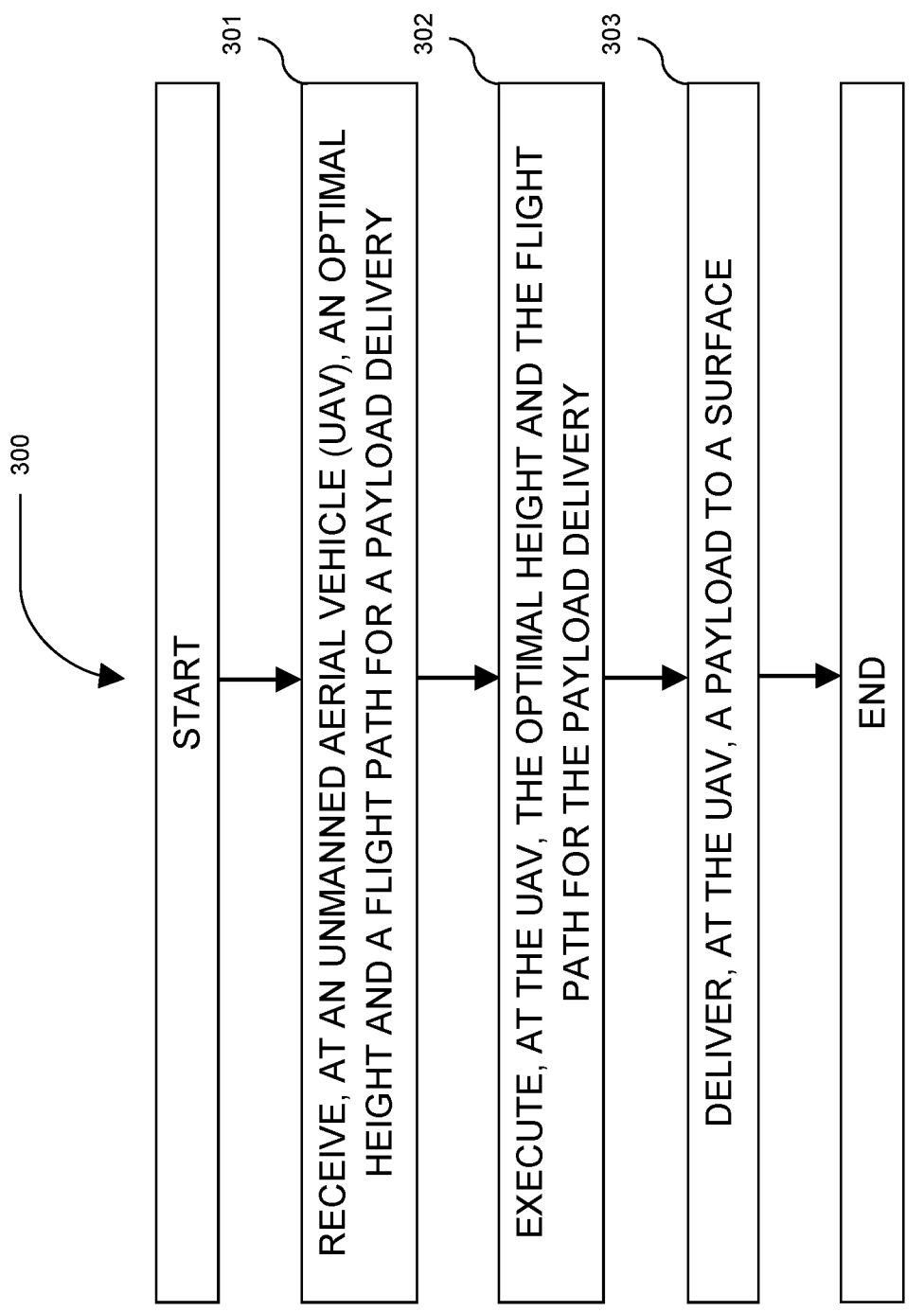
FIG. 3 is a flowchart of a method for automated payload delivery by a UAV, according to an embodiment.

FIG. 3 is an example flowchart 300 of a method for automated payload delivery by a UAV, implemented in accordance with an embodiment.

At 301, a navigation plan is received. In an embodiment, the navigation plan includes an optimal height and a flight path. In an embodiment, the optimal height, an optimal height range, a flight path, a combination thereof, and the like, are received by the UAV. In an embodiment, a UAV is configured to generate a navigation plan, a flight path, and the like, and is further configured to transmit the generated navigation plan, flight path, etc. to a control server for confirmation. In such embodiments, receiving the navigation plan is receiving a confirmation from the control server that the navigation plan, flight path, and the like, are approved for execution.

In certain embodiments, the optimal height, the optimal height range, and the like, are a height (or height range) at which a payload is lowered from the drone, UAV, and the like, to the destination.

In an embodiment, the navigation plan, the optimal height, an optimal height range, a flight path, a combination thereof, and the like, are transmitted to the UAV, for example by a control station.

In some embodiments, the navigation plan includes a destination location, payload information and the like. In certain embodiments, the payload information includes payload weight, payload length, payload width, payload height, combinations thereof, and the like.

At 302, the navigation plan is executed. In an embodiment, a UAV is configured to execute the navigation plan. In an embodiment, the UAV includes a memory (e.g., to store the navigation plan), a processing circuitry, and the like. In some embodiments, the memory includes instructions which, when executed by the processing circuitry, configures the UAV to execute the navigation plan.

In certain embodiments, executing the navigation plan includes configuring the drone, UAV, and the like, to load a payload into the UAV, wherein the payload is affixed to the UAV with a rope, a cord, and the like, which is utilized to deliver the payload from the drone to the ground at the destination.

In some embodiments, a drone is configured to navigate with a payload to a destination location. In certain embodiments, the drone is further configured to hover at the optimal height, in the optimal height range, and the like, until a payload release command is received by the drone.

In certain embodiments, a payload release command is generated by a user device, for example a user device which is associated with the destination location. A method for generating a payload release command is discussed in more detail below. In some embodiments, the control station configures the UAV to release the payload, for example by lowering the payload utilizing the tether attached thereto, in response to receiving a release command from a user device which is physically present in the delivery location (i.e., the destination location).

At 303, the payload is delivered. In an embodiment, delivering the payload includes initiating an instruction to lower the payload from the UAV at the optimal height, in the optimal height range, and the like, towards the ground, a surface on which the payload can rest, and the like.

In some embodiments, the payload is delivered in response to receiving a payload release command from a user device, a control station, flight server, and the like.

Figure 4:
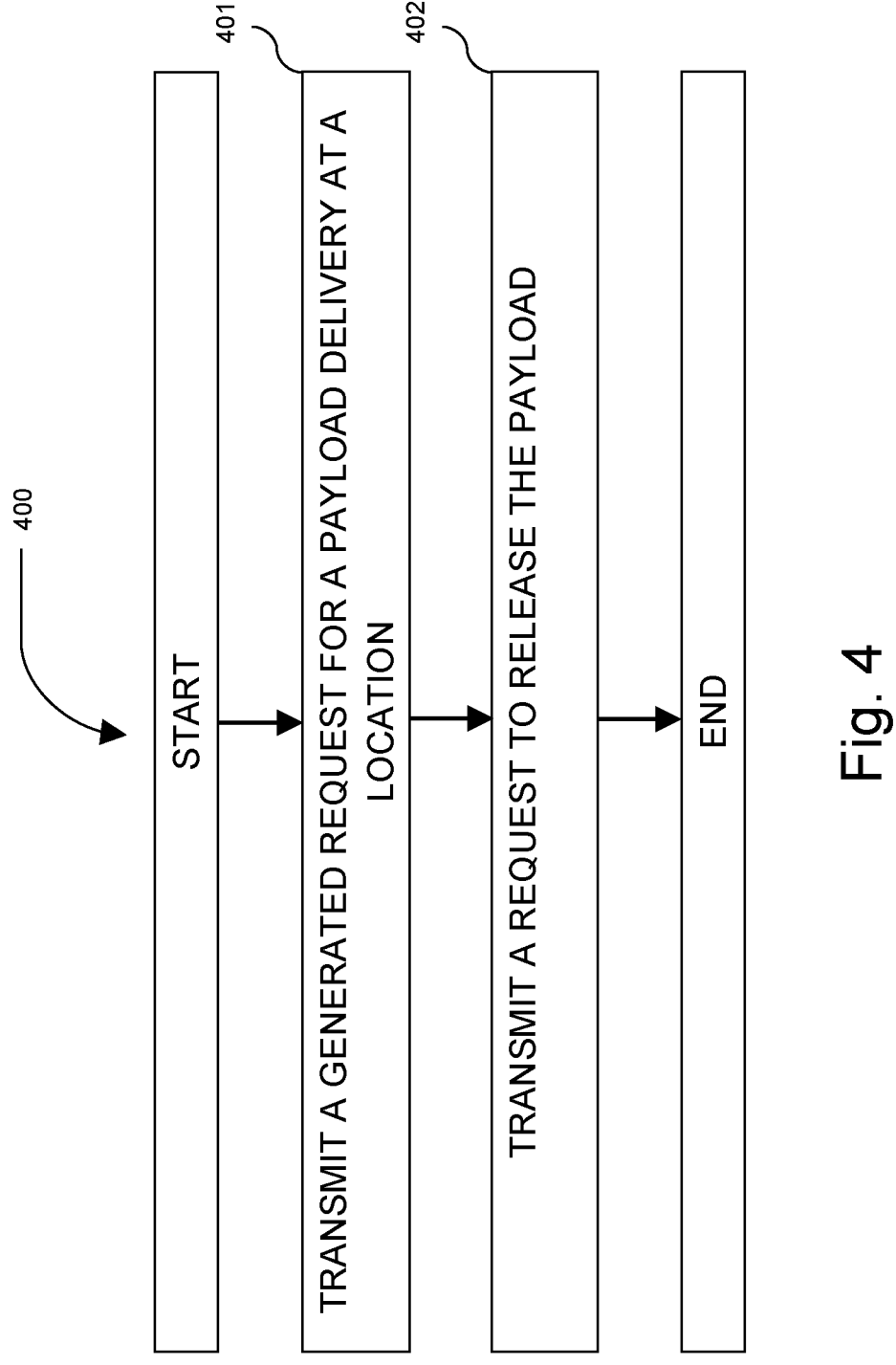
FIG. 4 is a flowchart of a method for automated payload delivery by instructions from a user device, according to an embodiment.

FIG. 4 is an example flowchart 400 of a method for automated payload delivery by instructions from a user device, implemented in accordance with an embodiment.

At 401, a payload request is sent from a user device. In an embodiment, the payload request includes payload data, such as an origin location, an SKU, a payload weight, a payload length, a payload height, a payload width, a user account identifier, a user device identifier, a phone number, a time at which to perform the delivery (e.g., 10:00), a date at which to perform the delivery (e.g., May 19, 1 day from today, etc.), a user device location, a permission to access a user device location, a combination thereof, and the like. In an embodiment, the user device is a user device of a recipient of the payload.

At 402, a request to release is generated. In an embodiment, the request to release is generated based on an instruction sent from a control station, the UAV, and the like, indicating that the UAV delivering the payload is at a delivery location, approaching a delivery location, a predetermined time away from being at the delivery location, a combination thereof, and the like.

In some embodiments, the request to release includes a predetermined secret, passphrase, password, authentication, a multi-factor authentication, a combination thereof, and the like. For example, in some embodiments, a control station is configured to generate a secret, such as a one-time password, a PIN, a password, and the like, and transmit the same to a user device, user account, combination thereof, and the like, for example as a short message service (SMS) message, an email, etc.

In an embodiment, the request to release includes the secret, which in some embodiments is received from the control station. In some embodiment, the UAV is configured to generate a secret, and transmit the secret to the control station. In an embodiment, the control station is configured to transmit the secret to the user device, user account, and the like.

In certain embodiments, the user device is configured to establish a communication interface with the UAV, for example utilizing a Bluetooth connection, a Wi-Fi connection, an RF communication, a combination thereof, and the like. In some embodiments, the secret is transmitted to the UAV over the established communication interface. In an embodiment, the UAV is configured to release the payload in response to receiving a secret which matches the secret generated by the UAV. In certain embodiments, the request to release is transmitted over the established communication interface.

Figure 5:
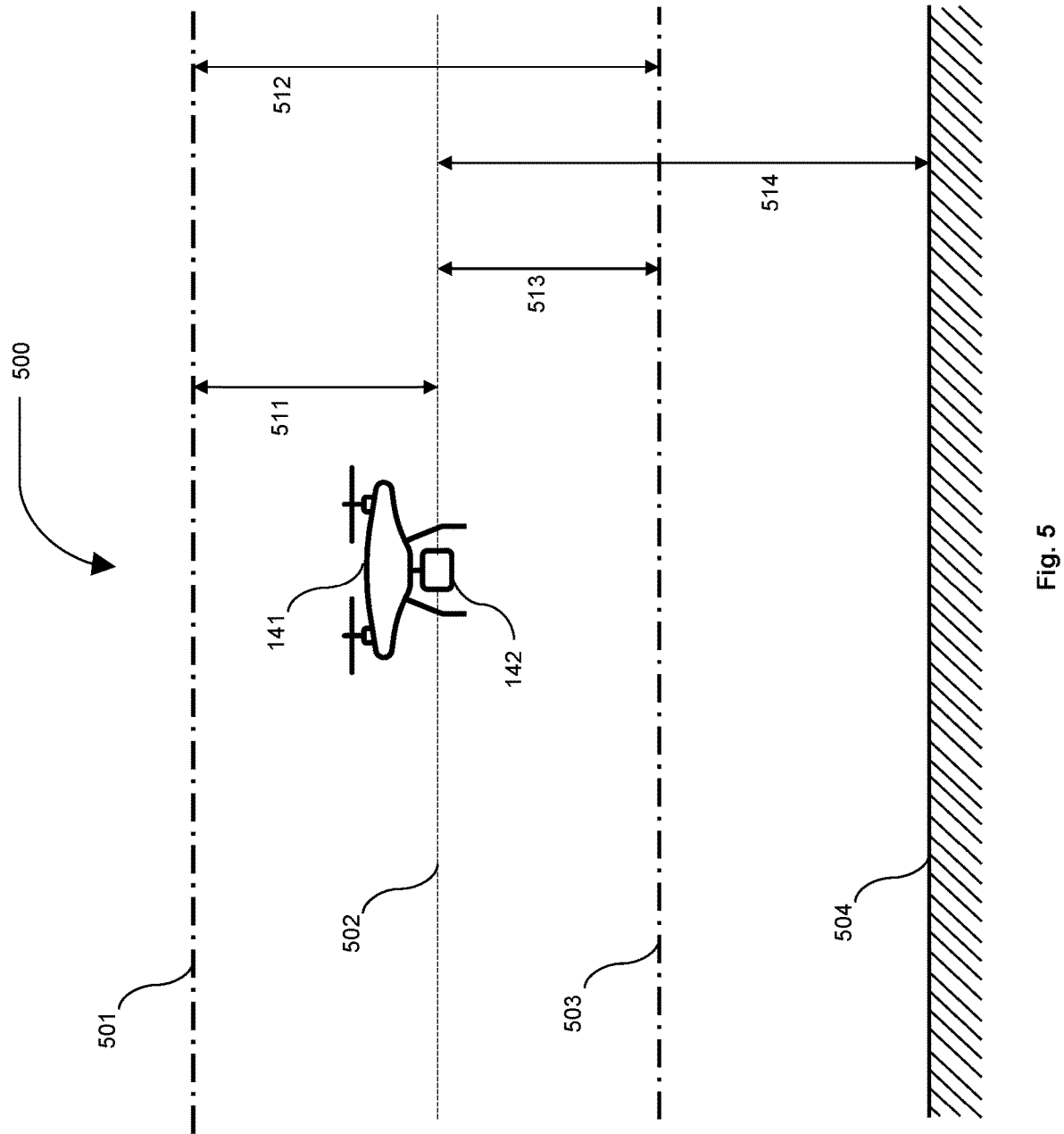
FIG. 5 is a diagram of a UAV delivering a payload prior to release, according to an embodiment.

FIG. 5 is an example diagram 500 of a UAV delivery height prior to release utilized to describe the various disclosed embodiments. According to an embodiment, a UAV 141 is configured to carry a payload 142 at an optimal height 502. In an embodiment, the optimal height 502 is within a range defined by a maximum height 501 and a minimum height 503. In some embodiments, the maximum height 501, the minimum height 503, a combination thereof, and the like, are predetermined, for example by aviation regulations.

In certain embodiments, the maximum height 501 is equal to, or equal to and less than, a maximum height of an aviation regulation. In certain embodiments, the minimum height 503 is equal to, or equal to and greater than, a minimum height of an aviation regulation. In certain embodiments, an optimal height range 512 (also referred to as the min-max difference), is defined between a value of the maximum height 501, and a value of the minimum height 503. In certain embodiments, the optimal height range 512 is defined for each waypoint, origin point, destination point, combination thereof, and the like.

In an embodiment, a maximal range 511 is defined between the maximum height 501, and the optimal height 502. In certain embodiments, the UAV 141 is configured to navigate at heights which are within the maximal range 511.

In some embodiments, a minimal range 513 is defined between the optimal height 502 and the minimum height 503. In certain embodiments, the UAV 141 is configured to navigate at heights which are within the minimal range 513.

In an embodiment, a distance 514 is defined between the optimal height 502 and the ground 504. For example, according to an embodiment, the optimal height 502 is based on a sea-level height measurement. In such embodiments, the optimal height 502 does not always match the distance to ground 504. For example, in an embodiment, the optimal height 502 is 70 meters above sea-level, and a destination location is 10 meters above sea-level. Therefore, the distance to ground 504 is 60 meters.

In some embodiments a height is defined based on sea-level, in other embodiments, height is a measurement of distance between the UAV 141 and the ground 504. In yet other embodiments, height can be based on sea-level for some measurements (e.g., in determining the optimal height range 512), and based on distance to ground for other measurements (e.g., distance 514). In an embodiment, distance to ground is determined by the UAV 141, for example by utilizing an optical range finder.

Figure 6:
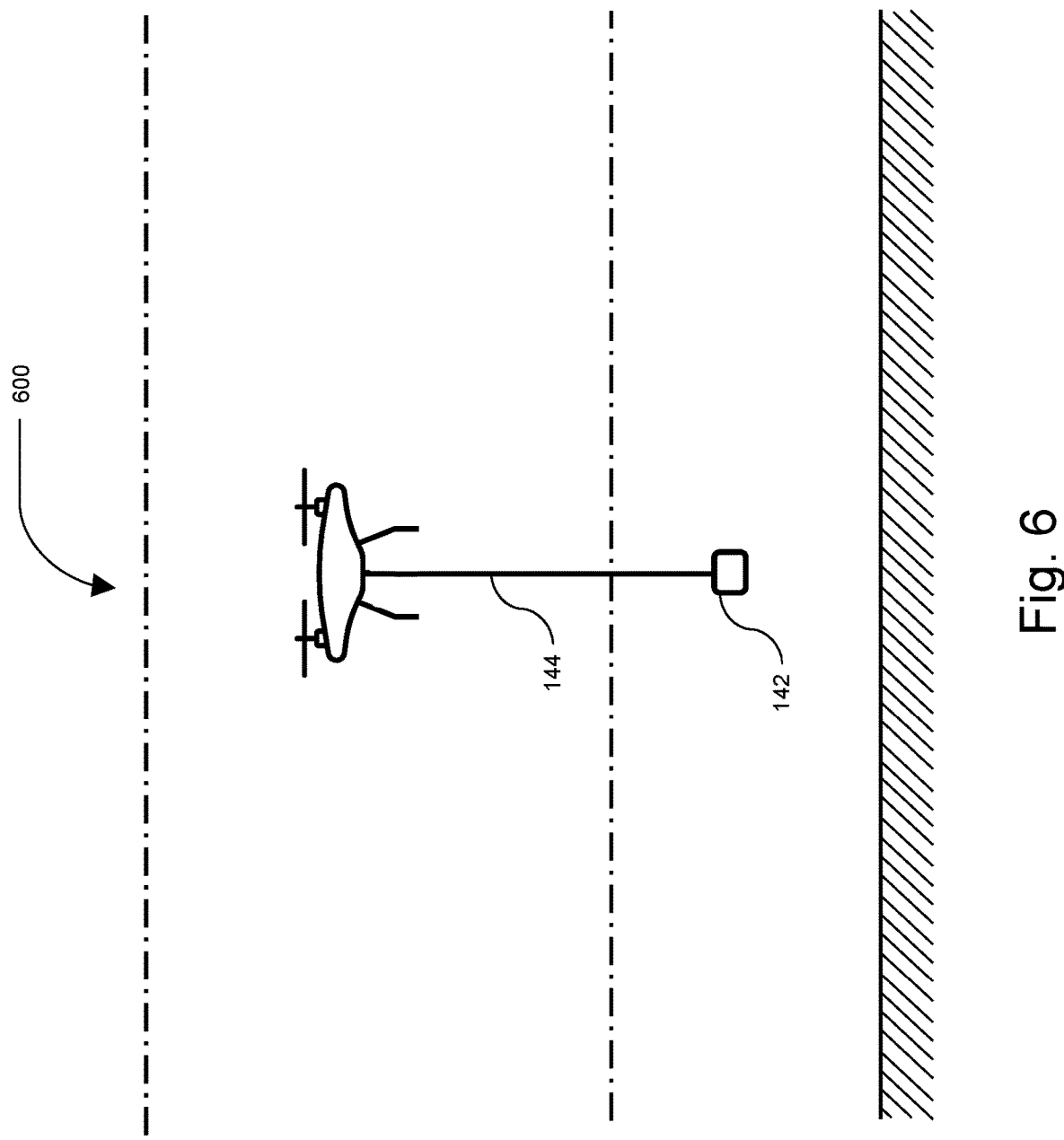
FIG. 6 is a diagram of a UAV delivering a payload during release, according to an embodiment.

FIG. 6 is an example diagram 600 of a UAV releasing a payload, utilized to describe an embodiment. In an embodiment, the UAV 141 is configured to release a payload 142 from the optimal delivery height to the ground 504 (or other surface). In an embodiment, the payload 142 is attached to the UAV by a tether 144.

In some embodiments, the tether 144 is coupled with a self-releasing hook (not shown) which is adapted to release from the payload once the payload touches a surface applying a normal force on the payload which negates a force exerted by gravity on the payload.

In certain embodiments, the UAV 141 is configured to generate a wind measurement, and determine a release coordinate based on the generated wind measurement. For example, where the wind measurement indicates that wind is blowing to the west, the UAV 141 is configured to determine a release coordinate such that when the payload is released from the UAV 141, the payload lands at the destination coordinate when taking into account the wind measurement. In an embodiment, the UAV 141 is configured to hover at a determined distance east of the destination coordinate, and release the payload there, in response to detecting, based on a wind measurement, a west-heading wind. In certain embodiments, the determined distance is determined by detecting a wind speed, based on the wind measurement, and determining a height of the UAV 141.

Figure 7:
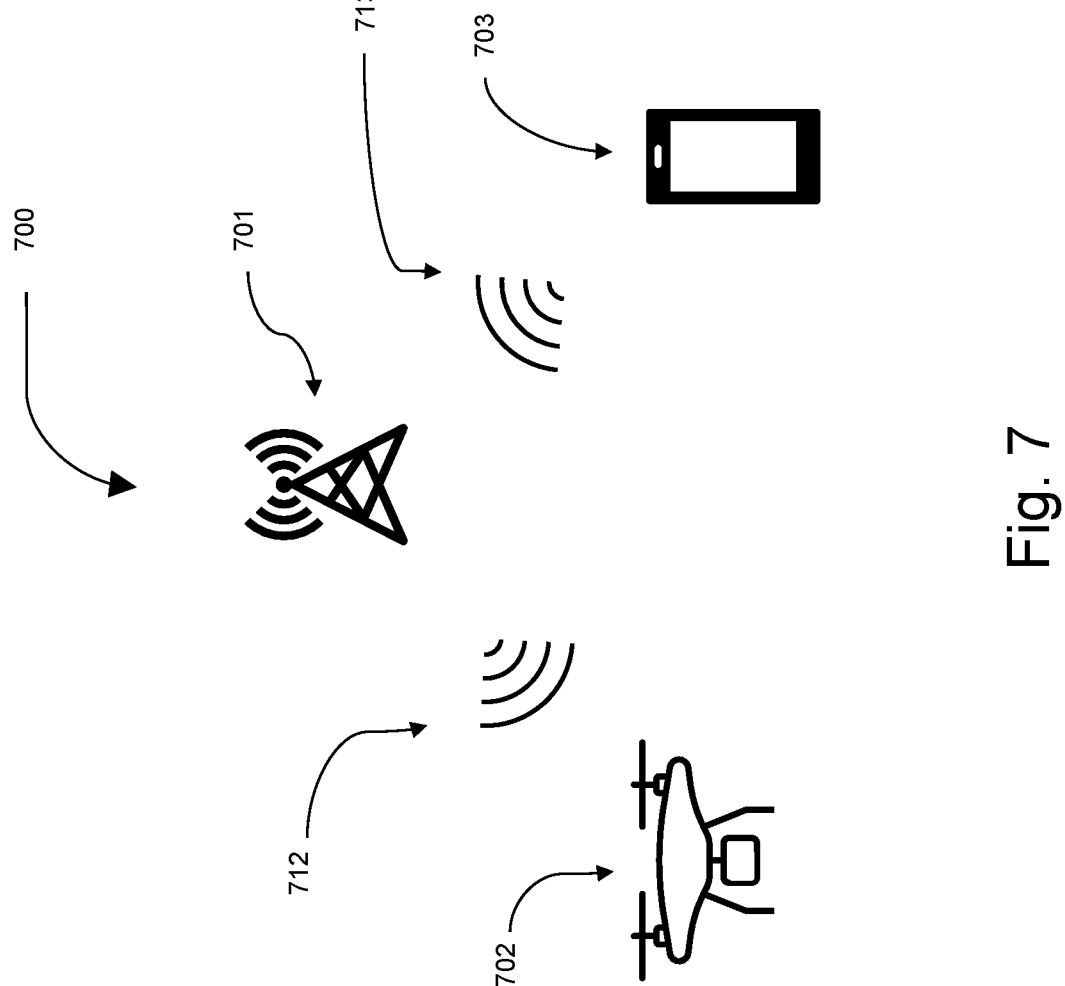
FIG. 7 is a diagram of a user device communicating with a control station and a control station communicating with a UAV, according to an embodiment.

FIG. 7 is an example of a communication diagram 700, implemented in accordance with an embodiment. In an embodiment, a user device 703 is configured to generate a request 713. In some embodiments, the request 713 is transmitted to a control station 701, for example over a network communication interface, such as described in more detail herein. In an embodiment, the network communication interface includes a wireless network, a cellular network, a wired network, a local area network (LAN), a wide area network (WAN), a metro area network (MAN), the Internet, the worldwide web (WWW), similar networks, a combination thereof, and the like.

In some embodiments, the control station 701 is configured to receive the user device request 713. A user device request 713 includes, according to an embodiment, an instruction to deliver a payload, an instruction to release a payload, an identifier of the user device 703, an identifier of a user account, a secret, an SKU of a payload, a combination thereof, and the like.

In certain embodiments, an identifier of a user device 703 is a unique identifier, such as a MAC address, an assigned name from a namespace, a unique IP address, a combination thereof, and the like. In some embodiments, an identifier of a user account is an email address, a username, a phone number, an IMEI, an IMSI, a combination thereof, and the like.

According to an embodiment, the control station 701 is configured to determine a navigation plan for payload delivery utilizing a UAV. In an embodiment, the navigation plan incudes an origin point, a destination point, an optimal height, an optimal height range, a flight path instruction, a combination thereof, and the like. In some embodiments instructions 712 are transmitted to a UAV 702, for example over a communication interface, including the navigation plan. In an embodiment, the UAV 702 is configured to receive the instructions 712 and executed the navigation plan.

Figure 8:
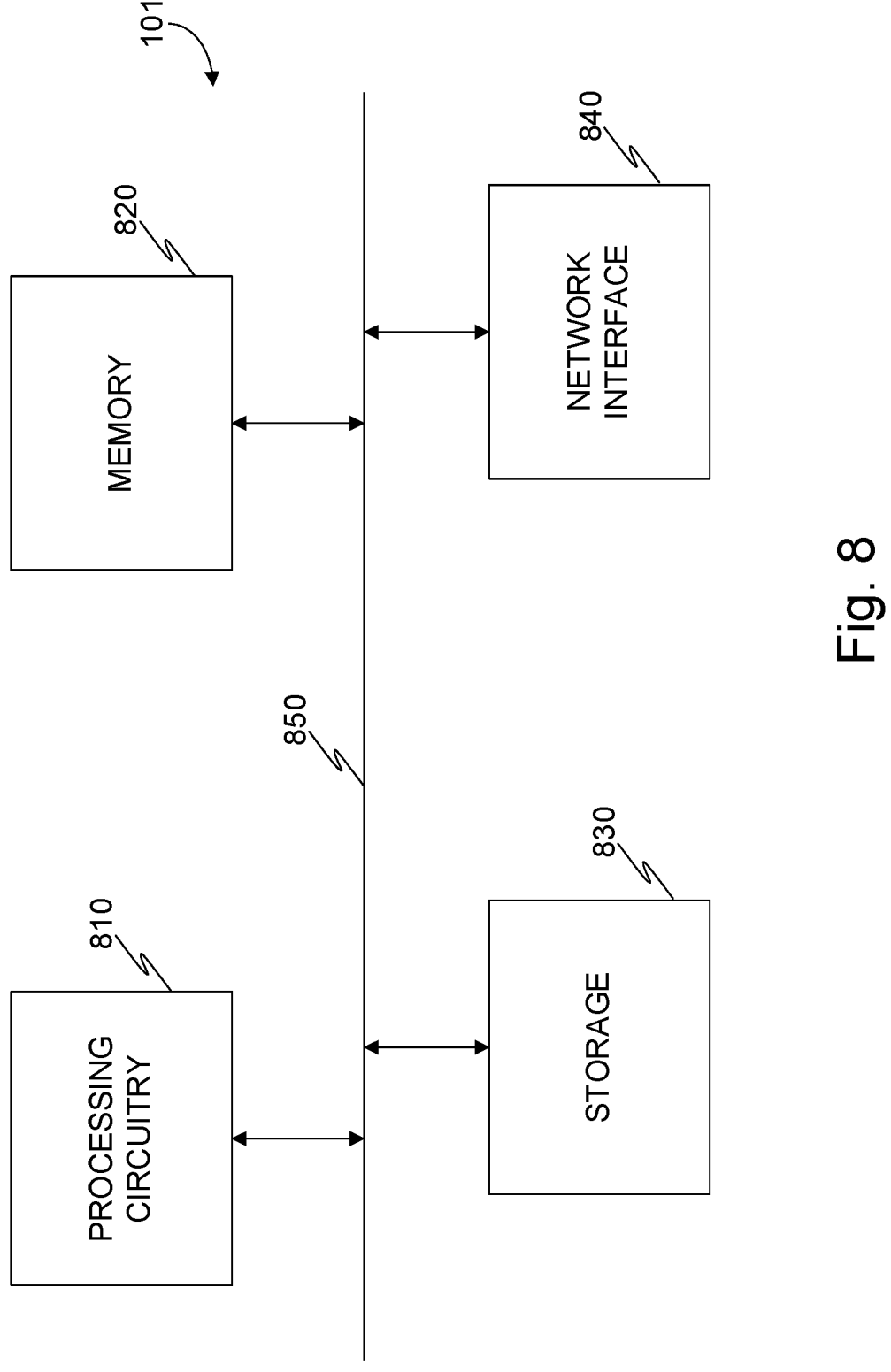
FIG. 8 is an example schematic diagram of a control station according to an embodiment.

FIG. 8 is an example schematic diagram of a control station 101 according to an embodiment. The control station 101 includes a processing circuitry 810 coupled to a memory 820, a storage 830, and a network interface 840. In an embodiment, the components of the control station 101 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof. In an embodiment, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein may be stored in the storage 830, in the memory 820, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 840 is configured to provide the control station 101 with communication with, for example, the UAV system 120.

It should be understood that the embodiments described herein are not limited to the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A computer-implemented method for using an unmanned aircraft system (UAS) to deliver a payload to a specified location by an unmanned aerial vehicle (UAV), comprising:

receiving a request for delivery of the payload, wherein the request includes a destination location;

generating a plurality of flight paths, wherein each flight path among the plurality of flight paths includes an origin point, the destination location, and at least one waypoint between the origin point and the destination location;

selecting a flight path among the plurality of flight paths based on a noise map, wherein the noise map includes measured noise values in decibels associated with geocoordinates, wherein the selected flight path includes a geocoordinate of the at least one waypoint with a measured noise value less than a first noise threshold;

transmitting navigation instructions based on the selected flight path;

receiving data indicating the UAV arrived at the destination location;

obtaining measurements at the destination location, wherein the measurements include wind conditions, ambient noise of the destination location and noise generated by the UAV;

comparing a total noise measured in decibels to a noise threshold, wherein the total noise includes the ambient noise of the destination location and the noise generated by the UAV;

determining an optimal release height at the destination location based on a result of the comparison, wherein the optimal release height is between a maximum bound and a minimum bound, wherein the optimal release height is closer to the minimum bound than the maximum bound in response to the total noise being below a second noise threshold;

determining a release coordinate based on the wind conditions such that the payload lands at the destination location when the payload is released from the UAV at the optimal release height; and releasing the payload at the determined release coordinate and at the determined optimal release height, wherein releasing the payload includes initiating, to the UAV, a command to lower the payload at the release coordinate and the optimal release height and in response to the command, lowering the payload, by the UAV, at the determined release coordinate and determined optimal release height.

2. The method of claim 1, further comprising:

transmitting a request for release to a user device of a recipient of the payload;

and receiving, from the user device, an authorization to release the payload.

3. The method of claim 1, wherein the wind conditions further include a direction of wind and wind speed.

4. The method of claim 1, further comprising:

generating a secret, wherein the secret includes a PIN; and verifying a received secret matches the generated secret prior to releasing the payload.

5. The method of claim 1, further comprising:
determining the total noise by adding the ambient noise of the destination location and the noise generated by the UAV.

6. The method of claim 1, wherein the optimal release height is closer to the maximum bound than the minimum bound in response to the total noise being above the second noise threshold.

7. The method of claim 1, wherein the optimal release height is further determined based on a state of matter of a portion of the payload.

8. The method of claim 1, wherein the geocoordinates include a latitude, a longitude, and a height.

9. The method of claim 3, wherein the optimal release height is further determined based on the wind speed, weight of the payload and volume of the payload.

10. The method of claim 3, wherein the release coordinate further includes an offset of the destination location based on the direction of the wind.

11. A non-transitory computer-readable medium storing a set of instructions for using an unmanned aircraft system (UAS) to deliver a payload to a specified location by an unmanned aerial vehicle (UAV), the set of instructions comprising:
one or more instructions that, when executed by one or more processors of a device, cause the device to:
receive a request for delivery of the payload, wherein the request includes a destination location;
generate a plurality of flight paths, wherein each flight path among the plurality of flight paths includes an origin point, the destination location, and at least one waypoint between the origin point and the destination location;
select a flight path among the plurality of flight paths based on a noise map, wherein the noise map includes measured noise values in decibels associated with geocoordinates, wherein the selected flight path includes a geocoordinate of the at least one waypoint with a measured noise value less than a first noise threshold;
transmit navigation instructions based on the selected flight path;
receive data indicating the UAV arrived at the destination location;
obtain measurements at the destination location, wherein the measurements include wind conditions, ambient noise of the destination location and noise generated by the UAV;
compare a total noise measured in decibels to a noise threshold, wherein the total noise includes the ambient noise of the destination location and the noise generated by the UAV;
determine an optimal release height at the destination location based on a result of the comparison, wherein the optimal release height is between a maximum bound and a minimum bound, wherein the optimal release height is closer to the minimum bound than the maximum bound in response to the total noise being below a second noise threshold;
determine a release coordinate based on the wind conditions such that the payload lands at the destination location when the payload is released from the UAV at the optimal release height; and
release the payload at the determined release coordinate and at the determined optimal release height, wherein releasing the payload includes initiating, to the UAV, a command to lower the payload at the release coordinate and the optimal release height and in response to the command, lower the payload, by the UAV, at the determined release coordinate and determined optimal release height.

12. A system for using an unmanned aircraft system (UAS) to deliver a payload to a specified location by an unmanned aerial vehicle (UAV) comprising:
one or more processors configured to:
receive a request for delivery of the payload, wherein the request includes a destination location;
generate a plurality of flight paths, wherein each flight path among the plurality of flight paths includes an origin point, the destination location, and at least one waypoint between the origin point and the destination location;
select a flight path among the plurality of flight paths based on a noise map, wherein the noise map includes measured noise values in decibels associated with geocoordinates, wherein the selected flight path minimizes a number of geocoordinates of the plurality of waypoints with measured noise values greater than a first noise threshold;
transmit navigation instructions based on the selected flight path;
receive data indicating the UAV arrived at the destination location;
obtain measurements at the destination location, wherein the measurements include wind conditions, ambient noise of the destination location and noise generated by the UAV;
compare a total noise measured in decibels to a noise threshold, wherein the total noise includes the ambient noise of the destination location and the noise generated by the UAV;
determine an optimal release height at the destination location based on a result of the comparison, wherein the optimal release height is between a maximum bound and a minimum bound, wherein the optimal release height is closer to the minimum bound than the maximum bound in response to the total noise being below a second noise threshold;
determine a release coordinate based on the wind conditions such that the payload lands at the destination location when the payload is released from the UAV at the optimal release height; and
release the payload at the determined release coordinate and at the determined optimal release height, wherein releasing the payload includes initiating, to the UAV, a command to lower the payload at the release coordinate and the optimal release height and in response to the command, lower the payload, by the UAV, at the determined release coordinate and determined optimal release height.

13. The system of claim 12, wherein the one or more processors are further configured to:
transmit a request for release to a user device of a recipient of the payload; and
receive, from the user device, an authorization to release the payload.

14. The system of claim 12, wherein the wind conditions further include a direction of wind and wind speed.

15. The system of claim 12, wherein the one or more processors are further configured to:
generate a secret, wherein the secret includes a PIN; and
verify a received secret matches the generated secret prior to releasing the payload.

16. The system of claim 12, wherein the one or more processors are further configured to:

determine the total noise by adding the ambient noise of the destination location and the noise generated by the UAV.

17. The system of claim 12, wherein the optimal release height is closer to the maximum bound than the minimum bound in response to the total noise being above the second noise threshold.

18. The system of claim 12, wherein the optimal release height is further determined based on a state of matter of a portion of the payload.

19. The system of claim 14, wherein the optimal release height is further determined based on the wind speed, weight of the payload and volume of the payload.

20. The system of claim 14, wherein the release coordinate further includes an offset of the destination location based on the direction of the wind.

* * * * *